Jan. 29, 1935.  B. VON LOUTZKOY  1,989,573

MONOTRACK VEHICLE

Filed Dec. 15, 1933

Inventor
Boris von Loutzkoy
by his attorneys
Howson and Howson

Patented Jan. 29, 1935

1,989,573

UNITED STATES PATENT OFFICE 1,989,573

MONOTRACK VEHICLE

Boris von Loutzkoy, Berlin, Germany

Application December 15, 1933, Serial No. 702,574
In Germany December 15, 1932

3 Claims. (Cl. 296—1)

Mono or single track vehicles are known, the wheels of which are provided with pneumatic tires and the carriage body of which individually possesses a stream-line like shape. In vehicles of this type the carriage body cannot adapt itself to the pneumatic tires in such a manner, that a uniform streamline like vehicle is formed in conjunction with the wheels.

In contradistinction thereto the novel feature of the invention lies in the fact that at least at the front portion, but preferably at each end of the body of the vehicle a hollow spherical wheel is arranged, which is sub-divided by means of india rubber containers in the form of sectors of a sphere, sections of a sphere or the like, through which spherical wheels the body of the vehicle as seen from above, will be supplemented to form a streamline like total or unit.

Figure 1:
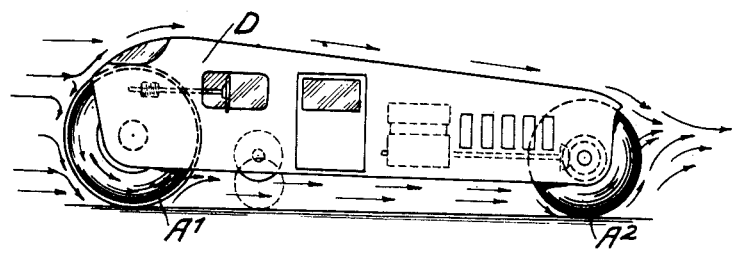
Figure 2:
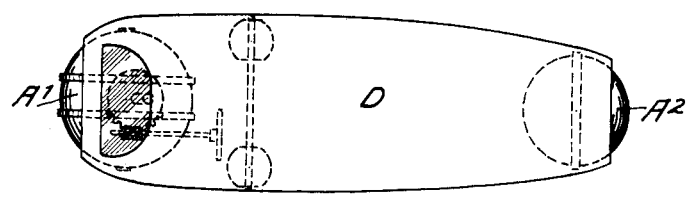

A preferred construction of the arrangement according to the invention is shown by way of example in the drawing in which Figures 1 and 2 illustrate a side and top view respectively of the mono-track vehicle.

Figure 3:
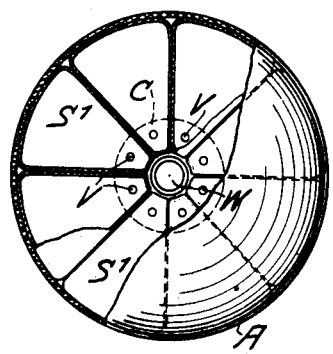
Figure 4:
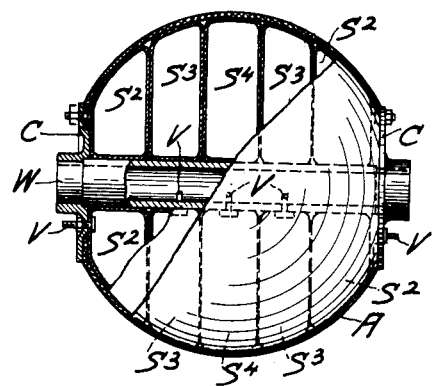

Figures 3 and 4 are cross sections through two different constructional forms of the hollow sphere.

In the streamline like motor-car according to this invention in lieu of the usual wheels carrying pneumatic tires, hollow spherical wheels $A^1$ and $A^2$ are provided at the extremities of the shell D of the vehicle, the interiors of which wheels are subdivided into compartments or chambers, as in Figures 3 and 4, and the compartments or chambers are inflated with air.

As shown in Figure 2, the carriage body when viewed from above combines with the said hollow spherical wheels to form a stream-line shaped vehicle, so that no eddies of air are produced, and the resistance of the air is reduced to a minimum.

The vehicle as seen from the side as in Fig. 1 however, cannot be given a true stream-line shape, but owing to the fact that both hollow spheres $A^1$ and $A^2$ are rotating while the vehicle is in motion, the currents of air are conducted along the shell of the car in such a manner, that the resistance of the air is reduced to a minimum value.

The volume of the air of such hollow spheres, the diameter of which is at least equal to that of the pneumatic tires now in use or which is even larger than that of dual pneumatic tires, surpasses the volume of air of the usual pneumatic tires by ten times and more, so that the usual leaf or helical springs, swinging wheel spindles and the like may be dispensed with while employing such hollow spheres. In consequence the weight of the vehicle is considerably less, the cost of manufacture is reduced and through the elimination of the spring elements all deficiencies inherent in such devices are avoided.

Vehicles equipped with such hollow spheres $A^1$ and $A^2$ do not require mud guards, and the said hollow spheres also serve as the customary buffers and in consequence they insure a desirable protection against accidents of all kinds.

The favorable streamline of such vehicles (Figures 1 and 2) renders possible to obtain a high efficiency and higher speeds with motors of less capacity.

The driving properties of such a vehicle are more favorable than with the usual motor-cars having pneumatic wheels, since apart from the reduction of the resistance of the air through the large surface of the hollow spheres and the single track arrangement of the vehicle, skidding of the vehicle on asphalt pavement and during braking of the vehicle is avoided. Naturally, a motor car of this type will also pass much better around curves. Motor-cars of this type are particularly adapted for racing purposes.

The said hollow spheres are sub-divided into several inner compartments or chambers (Figures 3 and 4) and thus afford greater safety during driving, because the air-tight chambers will expand correspondingly if one or more of the said compartments should become punctured permitting the driving to be continued without any danger to the occupants of the car, while with motor-cars having the usual pneumatic tires the vehicle may overturn, if one of the pneumatic tires should burst.

In Figure 3 the hollow sphere A is sub-divided into sector shaped compartments or chambers $S^1$. These chambers or cells may be either vulcanized in the hollow sphere proper or they may be formed as india rubber containers, which may be inflated with air by means of valves V, passing through the lateral cover C to the outside, so that they are easily accessible from outside. The introduction or removal of the india rubber containers is effected by removing the cover C.

In the modification shown in Figure 4 the chambers or the rubber containers are formed as parallel rings $S^2$, $S^3$ and $S^4$.

While in the example shown in Figure 3 all air valves V may be arranged in one of the lateral discs or covers C, the valves of the india rubber containers $S^2$ of Fig. 4 are arranged in the covers C on both sides of the hollow sphere, while the valves of the containers $S^3$, $S^4$ and $S^3$ located between the two containers $S^2$ extend into the hollow shaft or spindle W.

The number of the sectors or parallel rings depends on the size of the hollow spheres. The dividing of the hollow spheres may also be carried through in a different manner.

I claim:

1. Mono-track vehicle comprising in combination a body of stream-line shape and a spherical wheel arranged at an end, said spherical wheel cooperating with the body of the vehicle to form a streamline shaped total.

2. Mono-track vehicle comprising in combination a body of streamline shape and spherical wheels at the ends of the said body said spherical wheels completing the body of the vehicle to a streamline shaped total.

3. Mono-track vehicle of the character described comprising in combination a body of streamline shape and spherical wheels centrally arranged at the ends of the said body, the surfaces of said wheels and body merging to form a streamline shaped unit.

BORIS von LOUTZKOY.